United States Patent [19]

Sharpe

[11] 4,118,929
[45] Oct. 10, 1978

[54] IMPACTION AUGMENTED JET ENGINE

[76] Inventor: Thomas H. Sharpe, 502 Dorr Ave., Belvedere, S.C. 29841

[21] Appl. No.: 778,424

[22] Filed: Mar. 17, 1977

Related U.S. Application Data

[63] Continuation-in-part of Ser. No. 739,943, Nov. 9, 1976, and Ser. No. 700,488, Jun. 28, 1976, abandoned, which is a continuation-in-part of Ser. No. 557,992, Mar. 13, 1975, abandoned, which is a continuation-in-part of Ser. No. 379,843, Jul. 12, 1973, abandoned, which is a continuation-in-part of Ser. No. 191,627, Oct. 22, 1971, Pat. No. 3,750,400, said Ser. No. 739,943, is a continuation of said Ser. No. 557,992.

[51] Int. Cl.² .............................................. F02K 7/10
[52] U.S. Cl. ....................................... 60/262; 60/269;
60/39.48; 60/39.49; 431/115
[58] Field of Search ................... 60/39.48, 39.49, 269,
60/39.52, 262; 431/115, 116

[56] References Cited

U.S. PATENT DOCUMENTS

| 3,323,304 | 6/1967 | Llobet et al. | 60/39.49 |
| 3,680,317 | 8/1972 | Kotoc | 60/39.52 |
| 3,800,531 | 4/1974 | Sharpe | 60/39.49 |
| 3,927,958 | 12/1975 | Quinn | 60/39.52 |

FOREIGN PATENT DOCUMENTS

807,419  1/1937  France ..................................... 60/39.49

Primary Examiner—Robert E. Garrett
Attorney, Agent, or Firm—B. J. Powell

[57] ABSTRACT

An impaction augmented jet engine with a primary burner unit and a primary impaction/induction unit which separates a portion of the exhaust gases from the burner unit for recirculation thereto and also separates fresh air by impaction and induction for mixing with the separated exhaust gases to supply the burner unit. The engine also includes an induction ram burner unit downstream of the primary burner unit so that the exhaust gases from the primary burner unit augment the fresh air passing into the induction ram burner unit for combustion.

5 Claims, 8 Drawing Figures

IMPACTION AUGMENTED JET ENGINE

CROSS-REFERENCE TO RELATED APPLICATIONS

This application is a continuation-in-part of my co-pending applications Ser. No. 739,943, filed Nov. 9, 1976 and Ser. No. 700,488, filed June 28, 1976, now abandoned, which are respectively a continuation and a continuation-in-part of my application Ser. No. 557,992, filed Mar. 13, 1975, now abandoned, which is a continuation-in-part of my application Ser. No. 379,843, filed July 12, 1973, now abandoned, which is in turn a continuation-in-part of my earlier application Ser. No. 191,627, filed Oct. 22, 1971 entitled "Engine", now U.S. Pat. No. 3,750,400.

BACKGROUND OF THE INVENTION

Because jet engines must be capable of operating at low plane speeds, currently used engines require a rotary compressor stage for supplying air under pressure to the burner section thereof and a turbine stage driven by the exhaust gases of the burner section to rotate the compressor stator. This requirement for rotating machinery has increased the weight of the engine as well as limited the maximum permissible operating temperature within the engine thus limiting the efficiency of the engine. Also, the high rotational speed of the rotating parts has required critical dynamic balancing of the parts and extensive maintenance to keep the engine operating properly.

SUMMARY OF THE INVENTION

These and other problems associated with the prior art are overcome by the invention disclosed herein by providing a means for supplying air to the burner section of the engine which requires no rotating parts in the engine. The invention maintains operation while the engine is stationery or moving at slow speeds. Because of the lack of moving parts, the temperatures within the engine can be raised to produce a more effective operation.

The apparatus of the invention includes generally a burner unit which discharges the burned exhaust gases through a primary impaction/induction unit that separates a portion of the exhaust gases for recirculation. A fresh air duct open to the atmosphere at the front end of the engine admits fresh air through the primary induction/impaction unit. The separated exhaust gases causes fresh air from the fresh air duct to be induced thereinto in the impaction/induction unit and the exhaust gas/fresh air mixture passes back into the inlet of the burner unit to support the combustion therein. That portion of the exhaust gases not separated in the impaction/induction unit passes rearwardly through a secondary induction unit which causes additional fresh air from the fresh air duct to be induced into the rearwardly moving exhaust gas stream. This rearwardly moving exhaust gas/fresh air stream may pass directly out through an exhaust nozzle or additional fuel may be injected thereinto and ignited before the stream passes out through the exhaust nozzle to serve as a ram burner. A jet pump assembly is provided in the inlet to the burner unit for injecting fuel into the burner unit and inducing the exhaust gas/fresh air mixture from the primary impaction/induction unit into the burner unit to start the engine and maintain operation at slow speed.

The primary impaction/induction unit has an exhaust separator section and a fresh air separator section. The exhaust separator section is connected to the primary burner unit at its exhaust outlet for separating a portion of the exhaust gases from its combustion chamber with the exhaust separator unit defining an exhaust venturi throat therein through which the separated portion of the exhaust gases pass to generate a pressure drop therein. The fresh air separator has a fresh air passage therethrough open to the atmosphere through the fresh air duct and includes a plurality of air impaction vanes in the fresh air passage. Each of the air impaction vanes defines a vane passage therein with a vane air impaction inlet opening to the vane passage facing the forward end of said fresh air passage so that a portion of the fresh air flowing through said fresh air passage will impact into the vane passage through the vane air impaction inlet opening. The vane passage is connected to the exhaust venturi throat in the exhaust separator unit so that the separated portion of the exhaust gases flowing through the exhaust venturi throat induces the fresh air separated by the air impaction vanes into the exhaust gases flowing into the combustion chamber of the primary burner unit through said jet pump unit.

These and other features and advantages of the invention will become more fully understood upon consideration of the following specification and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to FIGS. 1-6, it will be seen that the first embodiment of the invention is incorporated in an engine 10. The engine 10 comprises a tubular housing 11 which defines a fresh air passage 12 therein that is open to the atmosphere at its leading end 14. An annular burner unit 15 is mounted in housing 11 concentrically thereof so that the fresh air passage 12 is annular as defined between the burner unit 15 and the housing 11 and is concentrically located about the engine centerline CL. A primary inpaction/induction unit 16 is located at the trailing end of fresh air passage 12 and the trailing discharge end of the burner unit 15 so that both the exhaust gases from the discharge end of burner unit 15 and the fresh air passing through the passage 12 must pass through the primary impaction/induction unit 16. A secondary induction unit 18 is located immediately downstream of the primary impaction/induction unit 16 so that both the fresh air and the exhaust gases passing through the primary impaction/induction unit 16 and out the downstream side thereof passes through the secondary induction unit 18. The downstream side of the secondary induction unit 18 connects with a ram burner unit 19 centered on the engine centerline CL. The fresh air and the exhaust gases passing through the secondary induction unit 18 pass into the ram burner unit 19. The downstream discharge of the ram burner unit 19 passes through an exhaust nozzle 20. The burner unit 15 is mounted in housing 11 by appropriate radially extending struts 17 best seen in FIG. 1.

Figure 1:
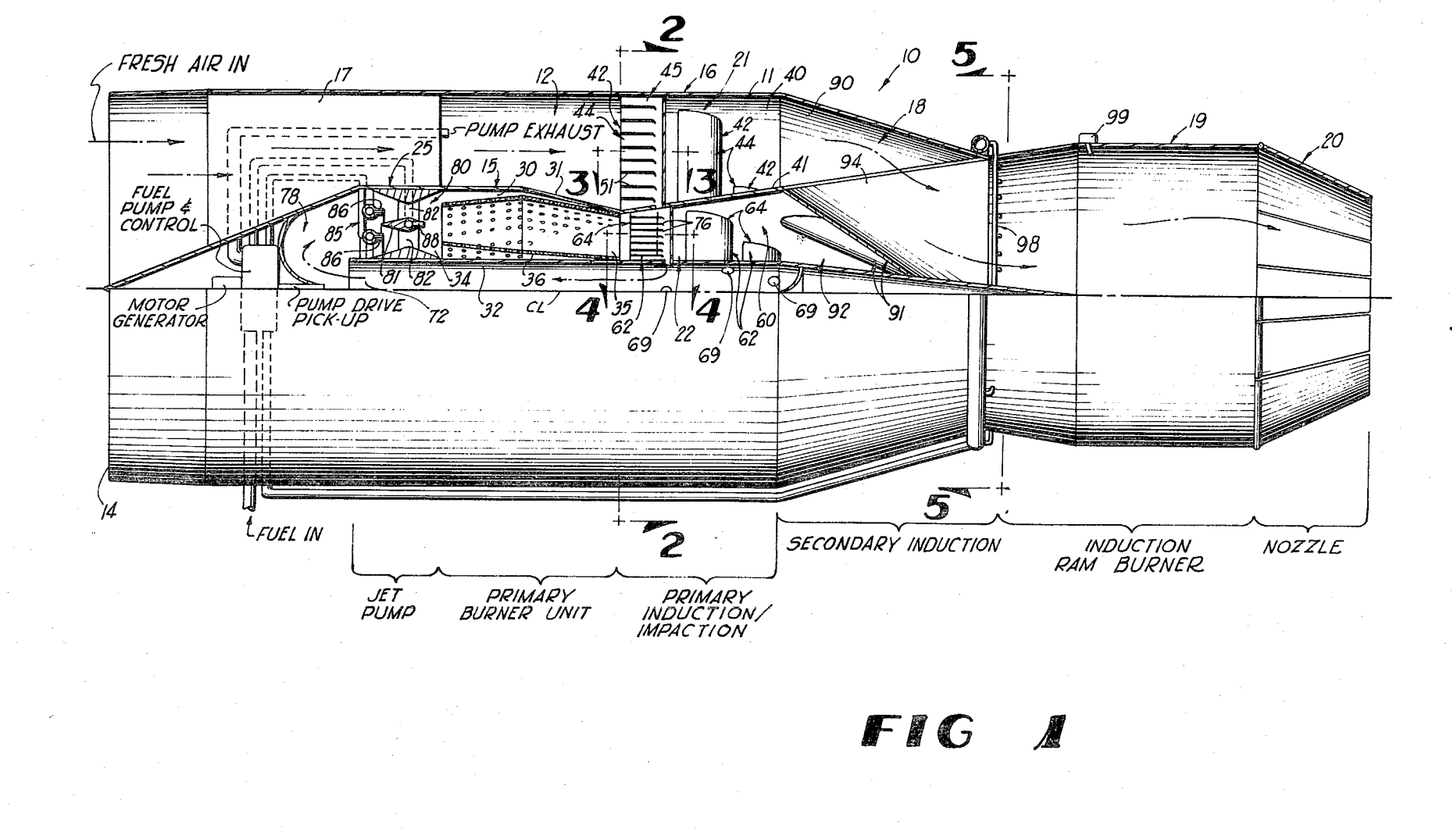
FIG. 1 is a side view of one embodiment of the invention shown partly in cross-section.

The primary impaction/induction unit 16 has a fresh air separator unit 21 through which the fresh air from passage 12 passes so that a portion of the fresh air is separated from the main fresh air stream for supplying the burner unit 15. The unit 16 also has an exhaust separator unit 22 through which the exhaust gases from burner unit 15 pass so that a portion of the exhaust gases are separated by impaction from the main exhaust gas stream. The exhaust separator unit 22 is inductively connected to the fresh air separator unit 21 so that the separated portion of the exhaust gases inductively increases the amount of fresh air separated from the main fresh air stream and the resulting exhaust gas/fresh air mixture is supplied to the burner unit 15.

The separated fresh air exhaust gases are supplied to the burner unit 15 through a jet pump unit 25. The jet pump unit 25 generates a jet pumping action by the injection of fuel into the separated fresh air/exhaust gas stream to force same into the burner unit while supporting combustion therein and creates a net pressure increase thereacross.

The burner unit 15 has an annular combustion chamber 30 defined between an outer burner wall 31 and an inner return tube 32, both concentric with centerline CL. An annular inlet 34 to chamber 30 is provided at the leading end thereof and an annular exhaust outlet 35 from chamber 30 is provided at the trailing end thereof. An annular burner can 36 is provided in combustion chamber 30 to retain the combustion flame therein.

Figures 2, 3:
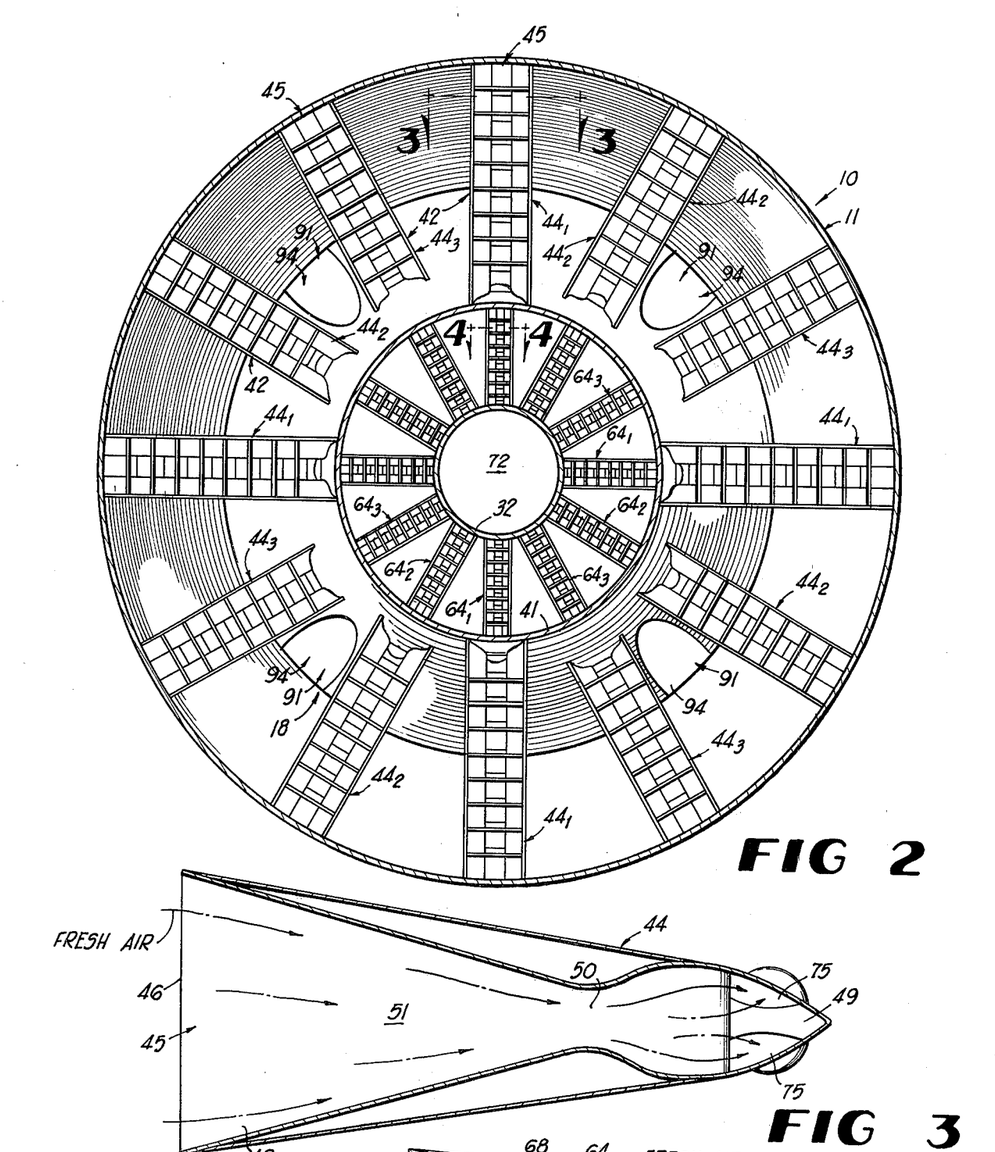
FIG. 2 is an enlarged transverse cross-sectional view taken along line 2—2 in FIG. 1.
FIG. 3 is an enlarged transverse cross-sectional view taken along line 3—3 in FIGS. 1 and 2.

The fresh air separator unit 21 is located at the downstream end of the fresh air passage 12 and defines an annular converging air separator passage 40 therethrough between the housing 11 and an annular separator wall 41 connected to the trailing end of the burner wall 31. The separator unit 21 best seen in FIGS. 2 and 3 includes a plurality of air impaction vane assemblies 42 with the impaction vane assemblies 42 being serially arranged within the air separator passage 40. It will be noted that each impaction vane assembly 42 includes a plurality of radially extended air impaction vanes 44 which are circumferentially spaced about the air separation passage 40. The impaction vane assemblies 42 are carried between the housing 11 and separator wall 41, and as best seen in FIG. 2, the impaction vanes 44 of each impaction vane assembly 42 are angularly offset with respect to the vanes 44 of the adjacent downstream vane assembly 42. For sake of clarity in FIG. 2, the impaction vanes 44 of the upstreammost assembly 42 are labelled $44_1$ while the next upstreammost assembly 42 has its impaction vanes labelled $44_2$ and the downstreammost vane assembly 42 has its vanes labelled $44_3$.

While the number of impaction vanes 44 in each assembly 42 and the number of vane assemblies 42 may be varied, four vanes 44 are illustrated in each assembly 42 and three assemblies 42 are illustrated.

As best seen in FIGS. 1-3, each air impaction vane 44 radially extends between the separator wall 41 and housing 11 normal to engine centerline CL. The vane 44 includes a radially extending vane passage 45 therein which has a forwardly facing open mouth 46 thereto along its leading edge so that the fresh air from passage 12 impinges into mouth 46. The vane passage 45 has a leading enlarged section 48 at the mouth 46 and a trailing smaller section 49 which is connected to the enlarged section 48 through a venturi throat 50. Thus, a portion of the fresh air flowing down the fresh air passage 12 will impact into the passage 45 of each vane 44 and be separated from the main fresh air stream. To guide the fresh air impacting into passage 45, a plurality of air guide baffles 51 may be spaced along the length of passage 45 in each vane 44 with each being generally normal to the radial axis of the vane 44. The baffles 51 extend from the mouth 46 of passage 45 to a point just rearwardly of venturi throat 50 and may be provided at their trailing ends with an inwardly directed lip to deflect the impacted fresh air radially inwardly along the trailing smaller section 49 of passage 45 to the inboard ends of vanes 44 at separator wall 41.

The exhaust separator unit 22 is located at the outlet of the burner unit 15 and defines an annular diverging exhaust separator passage 60 therethrough between the inner return tube 32 and the annular separator wall 41. The separator unit 22 includes a plurality of exhaust impaction vane assemblies 62 with the impaction vane assemblies 62 being serially arranged within the exhaust separator passage 60. It will be noted that each impaction vane assembly 62 includes a plurality of radially extended exhaust impaction vanes 64 which are circumferentially spaced about the exhaust separation passage 60. The exhaust impaction vanes 64 are angularly offset like air impaction vanes 44 and are radially aligned with the air impaction vanes 44. The exhaust impaction vanes 64 of the assemblies 62 are labelled $64_1$–$64_3$ to correspond to the air impaction vanes $44_1$–$44_3$.

Figure 4:
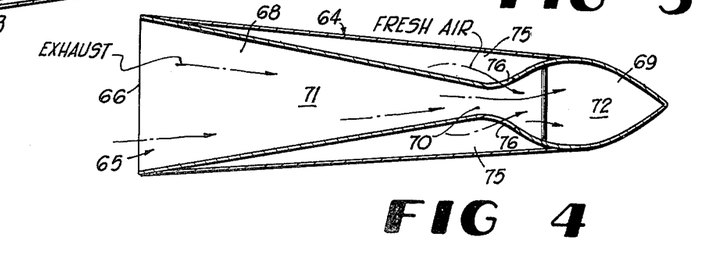
FIG. 4 is an enlarged transverse cross-sectional view taken along line 4—4 in FIGS. 1 and 2.

As best seen in FIGS. 1, 2 and 4, each exhaust impaction vane 64 radially extends between the separator wall 41 and return tube 32 normal to engine centerline CL. The vane 64 includes a radially extending exhaust vane passage 65 therein which has a forwardly facing open mouth 66 thereto along its leading edge so that the exhaust gases issuing from the burner unit 15 will impinge into mouth 66. The exhaust vane passage 65 has a leading enlarged section 68 at the mouth 66 and a trailing smaller section 69 which is connected to the enlarged section 68 through a venturi throat 70. Thus, that portion of the exhaust gases flowing from the burner unit 15 will impact into exhaust vane passages 65 and be separated from the main exhaust gas stream. To guide the exhaust gases impacting into passage 65, a plurality of exhaust guide baffles 71 may be spaced along the length of passage 65 in each exhaust vane 64 with each being generally normal to the radial axis of the vane 64. The baffles 71 extend from the mouth 66 of passage 65 to a point just rearwardly of venturi throat 70 and may be provided at their trailing ends with an inwardly directed lip to deflect the impacted exhaust gases radially inwardly along the trailing smaller section 69 of passage 65 through the inboard ends of vanes 64 into the return passage 72 in return tube 32 to be supplied to the inlet end of the burner unit 15.

As best seen in FIGS. 1, and 2 and 4, each of the exhaust impaction vanes 64 defines a pair of radially extending side passages 75 along opposite sides of the venturi throat 70. The outboard ends of both side passages 75 are connected to the inboard end of the smaller section 49 of the air impaction vane 44 radially aligned with the exhaust impaction vane 64 so that the fresh air separated by air impaction vane 44 passes inwardly along the side passages 75 in the exhaust impaction vane 64. The side passages 75 communicate with the exhaust vane passage 65 through ports 76 into the venturi throat 70 in vane 64. The ports 76 may be in the form of apertures or slots, the slots being illustrated in the figures. The pressure drop generated when the separated exhaust gases pass through the venturi throat 70 cause the fresh air in the side passages 75 to be induced into the exhaust vane passage 64 through ports 76. The induction action of the exhaust gases through venturi throat 65 serves to enhance the separation capability of the air impaction vane 44 over and above that due to impaction of the fresh air into the air impaction vanes 44.

The inner return tube 32 extends from downstream of the primary impaction/induction unit 16 forwardly of the burner unit 15 as best seen in FIG. 1. The inboard ends of the smaller sections 69 of the exhaust vane passages 65 in exhaust impaction vanes 64 communicate with the return passage 72 in tube 32 so that the separated exhaust gas/fresh air mixture from the primary impaction/induction unit 16 is injected into the passage 72 in tube 32 for passage forwardly toward the inlet to the burner unit 15. The forward end of the return passage 72 in the return tube 32 discharges into an annular reversing passage 78 which deflects the exhaust gas/fresh air mixture outwardly and then rearwardly into the inlet end of the jet pump unit 25.

The jet pump unit 25 is best seen in FIG. 1 and defines an annular passage therethrough through which the exhaust gas/fresh air mixture passes into the burner inlet 34. The jet pump unit 25 defines a pumping venturi 80 therethrough through which the exhaust gas/fresh air mixture passes to the combustion chamber 30 in burner unit 15. An annular venturi vane 81 is located in venturi 80 to divide venturi 80 into a pair of venturi throats 82. A jet pump injector assembly 85 is located just upstream of the venturi throats 82. The injector assembly 85 includes a pair of annular injector nozzles 86, one being aligned with each of the venturi throats 82 so that the fuel being discharged from the nozzles 86 passes axially through the venturi throats 82. Because the fuel is injected under a high pressure and velocity through the venturi throats 82, the exhaust gas/fresh air mixture at the upstream end of the venturi 80 will be pumped through the venturi throats 82 to increase the pressure downstream of throats 82 and generate the jet pumping action. Any additional fuel required for combustion is supplied through secondary injector nozzles 88 downstream of venturi 80, here shown carried in the venturi vane 81.

Figure 5:
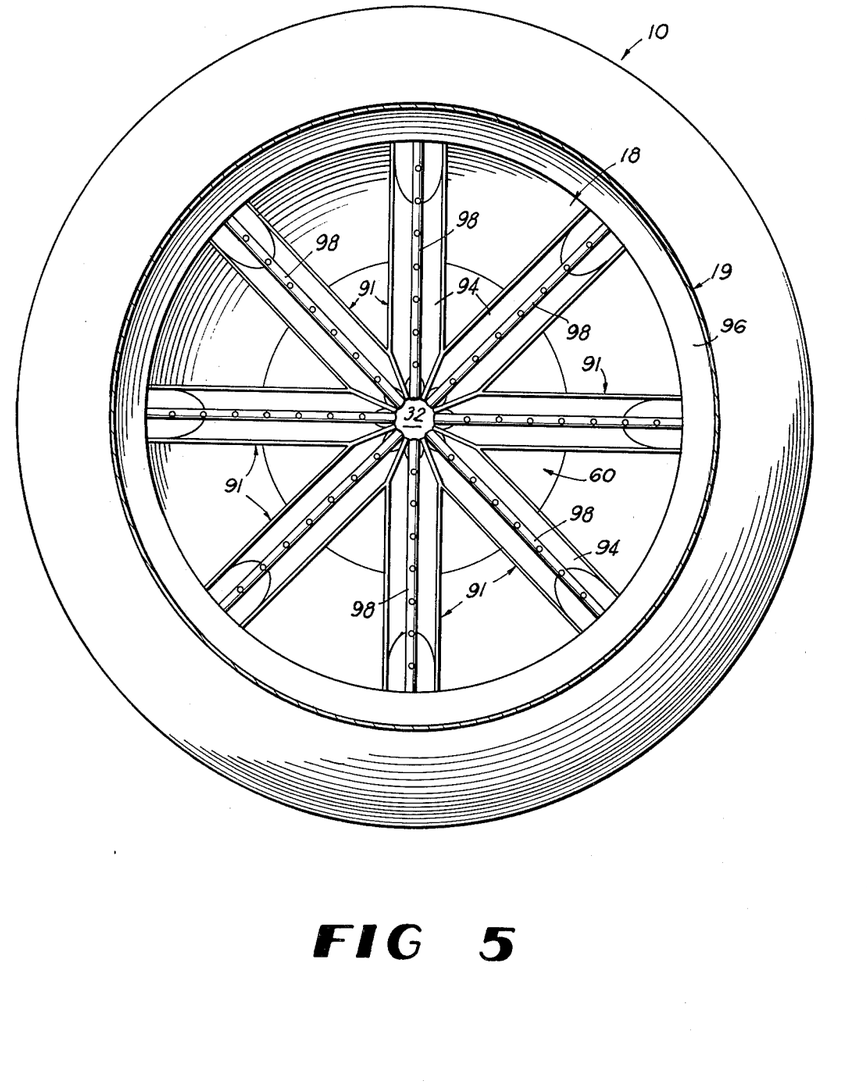
FIG. 5 is an enlarged transverse cross-sectional view taken along line 5—5 in FIG. 1.

The secondary induction unit 18 is connected to the downstream end of the primary impaction/induction unit 16 as best seen in FIGS. 1 and 5. The secondary induction unit 18 has an annular fresh air inlet 90 defined between a continuation of separator wall 41 and the housing 11 which angle together at their trailing ends. The secondary induction unit 18 defines an induction exhaust passage 92 between wall 41 and inner tube 32 through which the main exhaust gas stream passing rearwardly of the primary impaction/induction unit 16 passes into the afterburner unit 19. A plurality of generally radially extending induction vanes 91 are positioned in the induction exhaust passage 92, and extend between the separator wall 41 and the inner tube 32. Thus, the main exhaust gas stream flows around vanes 91. Each of the induction vanes 91 defines an air induction passage 94 therethrough which opens into the fresh air inlet 90 at its outer end and into the afterburner unit 19 at its trailing end. Thus, the fresh air not separated by air impaction vanes 44 can flow into the afterburner unit 19 through the air induction passages 94 in air induction vanes 91. The action of the main exhaust stream flowing around vanes 91 serves to inductively enhance the flow of the fresh air through induction vanes 91.

The ram burner unit 19 defines a ram burner combustion chamber 96 therein about centerline CL bounded by housing 11. The exhaust gases and fresh air from the secondary induction unit 18 pass into the leading end of the combustion chamber 96 for mixing and combustion, if desired. The gases passing out of the trailing end of the ram burner combustion chamber 96 exit to the atmosphere through the exhaust nozzle 20. A ram burner fuel injection assembly 98 is provided in the ram burner combustion chamber 96 just downstream of the secondary induction unit 16 to selectively inject fuel into the ram burner combustion chamber 96 when operation of the ram burner is desired. It will be noted that the fuel is injected into the fresh air zone in the ram burner unit 19 just downstream of the outlet of vane passages 94.

In operation, the first embodiment of the invention is started by supplying fuel under pressure to the jet pumping nozzles 86 in jet pumping unit 25 from the fuel pump and control seen in FIG. 1. As the fuel from nozzles 86 is sprayed axially through the venturi throats 82, air from the reversing passage 78 is induced thereby into the combustion chamber 30 where the air/fuel mixture is ignited in conventional manner such as by igniter plugs (not shown). The jet pumping action serves to induce air from the fresh air passage 12 via air impaction vanes 44, exhaust impaction vanes 64, and the inner return tube 32.

After ignition, the exhaust gases impacting into the exhaust impaction vanes 64 causes additional fresh air from passage 12 to be induced through the air impaction vanes 44 and pass with the separated exhaust gases to the jet pumping unit 25 via return tube 32. This enhances the performance of the jet pumping unit 25 by raising the pressure downstream thereof. To insure complete combustion of the fuel in the primary combustion chamber 30, appropriate fresh air induction vanes (not shown) may be provided upstream of the primary impaction/induction unit 16 to directly inductively connect the fresh air passage 12 to combustion chamber 30.

At the same time, the main exhaust gas stream passing through the exhaust separator passage 60 then passes through the secondary induction unit 18. As this exhaust gas stream flows around the downstream end of vane passages 94 in unit 18, additional fresh air from passage 12 is induced thereinto through the vane passages 94 to generate a fresh air zone flowing into the ram burner combustion chamber 96 as well as an exhaust gas zone. When fuel is sprayed into the fresh air zone from the fuel injection nozzles 98 and ignited by igniter plugs 99 seen in FIG. 1, the ram burner unit 19 is operated. The gases then pass out through adjustable nozzle 20.

Forward motion of the engine 10 serves to increase the effective pressure of the fresh air in the fresh air passage 12 to enhance the operation thereof. The fuel pump and control is usually driven by the fresh air/exhaust gas mixture in the return tube 32 as seen in FIG. 1 to pump the fuel to nozzles 86. The nozzles 86 are used all of the time the engine is operated to maintain the pressure differential thereacross. If additional fuel is needed, then it is supplied through nozzles 86 directly into the primary combustion chamber 30 downstream of venturi 80.

SECOND EMBODIMENT

Figure 6:
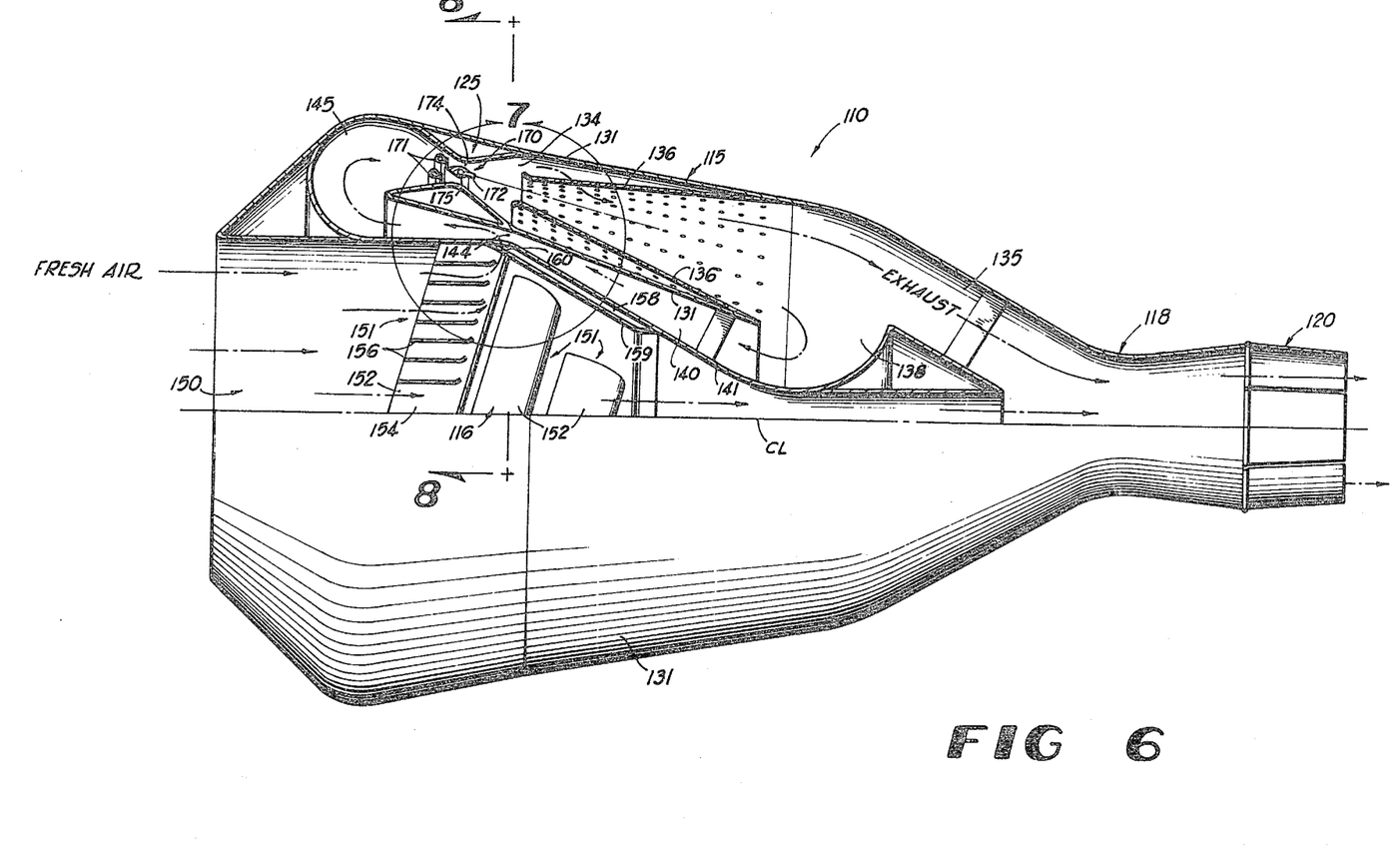
FIG. 6 is a side view of a second embodiment of the invention shown partly in cross-section.

Referring to FIG. 6, a second embodiment of the invention is illustrated incorporated in an engine 110 with centerline CL. The engine 110 has an annular burner unit 115, a primary impaction/induction unit 116 which separates a portion of the exhaust gases from the burner unit 115 for recirculation back to the inlet of the burner unit 115 and also inductively and impactively supplies fresh air to the separated exhaust gases. The exhaust gas/fresh air mixture from the primary impaction/induction unit 116 are forced into the inlet of the burner unit 115 by a jet pump unit 125 which also supplies the fuel for combustion. The main exhaust gas stream from burner unit 115 passes through a mixing unit 118 which supplies fresh air to the main exhaust gas stream before discharge to the atmosphere through exhaust nozzle 120.

The burner unit 115 defines an annular combustion chamber 130 therein between inner and outer burner walls 131. The chamber 130 angles inwardly toward the engine centerline CL with an annular inlet 134 thereto. An annular burner can assembly 136 is provided in chamber 130 to serve as a flame arrestor. An annular separator opening 138 from chamber 130 is provided through the inner burner wall 131 downstream of the burner can assembly 136 so that a portion of the exhaust gases from the combustion chamber 130 can escape therethrough to be separated from the main exhaust gas stream as will become more apparent. The main exhaust gas stream exits the combustion chamber 130 through an annular exhaust outlet 135 into the mixing unit 118.

The primary impaction/induction unit 116 includes an annular exhaust return passage 140 defined between the inner burner wall 131 and an annular separator wall 141, and which communicates with the separator opening 138 from combustion chamber 130 so that the separated exhaust gases pass forwardly toward the burner inlet 134. The return passage 140 has a venturi throat 144 therein through which the separated exhaust gases pass before reaching the burner inlet 134. The forward end of the return passage 140 communicates with an annular reversing passage 145 that directs the gases rearwardly toward the burner inlet 134 through the jet pump unit 125.

The impaction/induction unit 116 also defines a fresh air passage 150 therethrough by the separator wall 141 which is open to the atmosphere at the forward end of the engine 110. A plurality of impaction vane assemblies 151 are mounted in passage 150, each vane assembly 151 including a plurality of generally radially extending air impaction vanes 152 similar to vanes 44 in the first embodiment. Each vane 152 has a radial vane passage 154 with a forwardly opening mouth 155 thereto along the length of vane 152. Thus, a portion of the fresh air passing along the passage 150 will impact into the vane passage 154 for separation and be deflected outwardly along the trailing portion of the vane passage 154 by baffles 156. The outer ends of the trailing portions of the vane passages 154 open into an annular transfer chamber 158 defined between the separator wall 141 and an annular transfer wall 159. Induction ports 160 through the separator wall 141 at the venturi throat 144 cause the separated fresh air in transfer chamber 158 to be induced into the exhaust gases flowing through the venturi throat 144 to form a fresh air/exhaust gas mixture which flows into the burner unit 115 through jet pump unit 125. The remainder of the fresh air flows through air passage 150 into the mixing unit 118 to be mixed with the exhaust gases from burner outlet 135 and be discharged to the atmosphere through exhaust nozzle 120.

Figure 7:
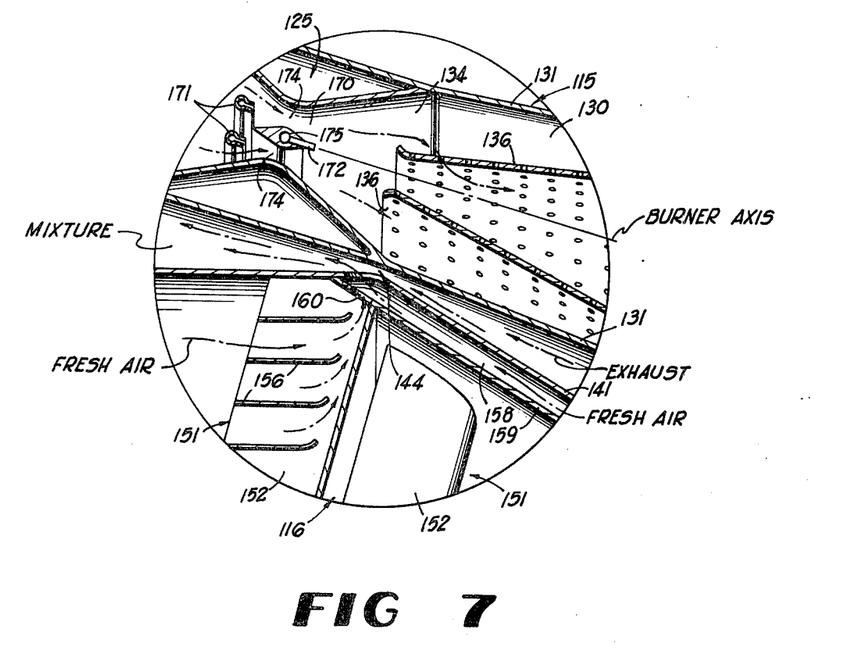
FIG. 7 is an enlarged portion of the second embodiment taken along line 7 in FIG. 6; and, FIG. 8 is a partial cross-sectional view taken generally along line 8—8 in FIG. 6.
Figure 8:
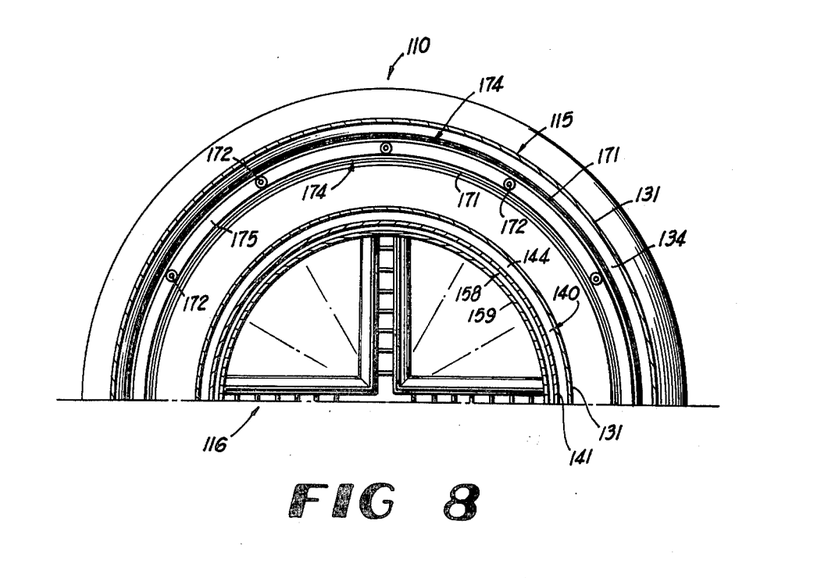

The jet pump unit 125 has a venturi 170 therethrough through which the fresh air/exhaust gas mixture flows into the inlet 134 of combustion chamber 130. The venturi 170 has a pair of venturi throats 174 therethrough formed by annular venturi vanes 175 as best seen in FIG. 7. An annular jet pump fuel injection nozzle 171 is provided in unit 125 for each throat 174 which injects fuel axially through the throat 174 of the venturi 170 from its upstream side. The fuel is injected from nozzles 171 under sufficient pressure and velocity to induce the fresh air/exhaust gas mixture into the combustion chamber 130 and raise the pressure thereof for combustion. Additional fuel may be added by nozzles 172 downstream of the venturi passage 170 to continue combustion.

In operation, the second embodiment of the invention is started similarly to the first embodiment by supplying fuel under pressure to the jet pumping nozzles 171 in jet pumping unit 125 from an appropriate fuel pump and control. As the fuel from nozzles 171 is sprayed axially through the venturi throats 174, air from the reversing passage 145 is induced thereby into the combustion chamber 130 where the air/fuel mixture is ignited in conventional manner such as by igniter plugs (not shown). The jet pumping action serves to induce air from the fresh air passage 150 via air impaction vanes 152 and exhaust return passage 140.

After ignition, the exhaust gases separated through separator opening 138 passes through venturi throat 144 in exhaust return passage 140 and causes additional fresh air from passage 150 to be induced therein through the air impaction vanes 152 and pass with the separated exhaust gases to the jet pumping unit 125. This enhances the performance of the jet pumping unit 125 by raising the pressure downstream thereof. To insure complete combustion of the fuel in the primary combustion chamber 130, appropriate fresh air induction vanes (not shown) may be provided upstream of the separator opening 138 to directly inductively connect the fresh air passage 150 to combustion chamber 130.

At the same time, the main exhaust gas stream passing through the exhaust outlet 135 then passes through the mixing unit 118. As this exhaust gas stream flows out the downstream end of the outlet 135, additional fresh air from passage 150 is induced thereinto so that the gases then pass out through adjustable nozzle 120. A ram burner similar to that of engine 10 may be provided.

Forward motion of the engine 110 serves to increase the effective pressure of the fresh air in the fresh air passage 150 to enhance the operation thereof. A fuel pump and control similar to that of engine 10 is usually provided to pump the fuel to nozzles 171. The nozzles 171 are used all of the time the engine is operated to maintain the pressure differential thereacross. If additional fuel is needed, then it is supplied through nozzles 172 directly into the primary combustion chamber 130 downstream of venturi 170.

It is to be understood that the air impaction vanes and/or the exhaust impaction vanes of either embodiment of the engine may be annular rather than radial as shown. The combustion chambers in the burner units may be made in a plurality of chambers rather than the single annular chamber.

I claim:

1. An impaction/induction engine comprising:
   a burner unit defining a combustion chamber therein, a burner inlet to said combustion chamber and an exhaust outlet from said combustion chamber;
   an exhaust separator unit connected to said burner chamber at said exhaust outlet for separating a portion of the exhaust gases in said combustion chamber, said exhaust separator unit defining the exhaust venturi throat therein through which the separated portion of the exhaust gases pass to generate a pressure drop therein;
   a jet pump unit connecting said exhaust venturi throat in said exhaust separator unit to said burner inlet to force the separated portion of the exhaust gases into said combustion chamber through said burner inlet, said jet pump unit defining a pumping venturi throat therein through which the separated portion of the exhaust gases passes and including a fuel injector assembly for injecting fuel into said combustion chamber through said pumping venturi throat to pressurize said combustion chamber;
   a fresh air separator unit defining a fresh air passage therein open to the atmosphere at its forward end and including a plurality of air impaction vanes in said fresh air passage, each of said air impaction vanes defining a vane passage therein, an air impaction inlet opening to said vane passage facing the forward end of said fresh air passage so that a portion of the fresh air flowing through said fresh air passage will impact into said vane passage through said air impaction inlet opening, said vane passage connected to said exhaust venturi throat in said exhaust separator unit so that the separated portion of the exhaust gases flowing through said exhaust venturi throat induces the fresh air separated by said impaction vanes into the exhaust gases flowing into said combustion chamber through said jet pump unit.

2. The impaction/induction engine of claim 1 wherein said exhaust separator unit defines an exhaust impaction passage therethrough through which the exhaust gases from said burner outlet pass, and further including a plurality of exhaust impaction vanes in said exhaust impaction passage, each of said exhaust impaction vanes defining an exhaust vane passage therein, an exhaust impaction inlet opening to said exhaust vane passage facing said burner outlet so that a portion of the exhaust gases passing from said burner outlet through said exhaust impaction passage is separated from the exhaust gases by impaction thereof through said exhaust impaction inlet opening into said exhaust vane passage, said exhaust venturi throat forming a portion of each of said exhaust vane passages.

3. The impaction/induction engine of claim 2 further including a secondary induction unit for receiving the fresh air from said fresh air passage and the exhaust gases from said exhaust impaction passage and mixing the fresh air and the exhaust gases.

4. The impaction/induction engine of claim 3 further including a ram burner unit for receiving the fresh air and exhaust gases from said secondary induction unit and for selectively injecting fuel thereinto for combustion.

5. The impaction/induction engine of claim 4 wherein said secondary induction unit injects the fresh air into said ram burner unit in a fresh air zone and injects the exhaust gases into said ram burner unit in a separate exhaust gas zone, and wherein said ram burner unit injects the fuel into the fresh air zone.

* * * * *